Jan. 20, 1959 D. D. WILLARD 2,869,965

ELECTRO-SENSITIVE DIGITAL DATA PLOTTER

Filed Dec. 30, 1954 4 Sheets-Sheet 1

INVENTOR.
DENNIS D. WILLARD
BY P. E. Henninger
ATTORNEY

Jan. 20, 1959 D. D. WILLARD 2,869,965

ELECTRO-SENSITIVE DIGITAL DATA PLOTTER

Filed Dec. 30, 1954 4 Sheets-Sheet 2

INVENTOR.
DENNIS D. WILLARD
BY
P. E. Henninger
ATTORNEY

Jan. 20, 1959 D. D. WILLARD 2,869,965

ELECTRO-SENSITIVE DIGITAL DATA PLOTTER

Filed Dec. 30, 1954 4 Sheets-Sheet 3

INVENTOR.
DENNIS D. WILLARD
BY P. Henninger
ATTORNEY

Jan. 20, 1959 D. D. WILLARD 2,869,965

ELECTRO-SENSITIVE DIGITAL DATA PLOTTER

Filed Dec. 30, 1954 4 Sheets-Sheet 4

INVENTOR.
DENNIS D. WILLARD
BY [signature]
ATTORNEY

United States Patent Office 2,869,965

Patented Jan. 20, 1959

2,869,965

ELECTRO-SENSITIVE DIGITAL DATA PLOTTER

Dennis D. Willard, Endicott, N. Y., assignor to International Business Machines Corporation, New York, N. Y., a corporation of New York Application December 30, 1954, Serial No. 478,840

4 Claims. (Cl. 346—74)

This invention relates to apparatus for providing a graphic representation of computations and more particularly to indicating computations on a paper graph.

One of the problems which arises after the derivation of engineering computations is the transposing and presentation of the computations in graphical form for quick and easy interpretation.

In general, when the results are presented as a series of tabulated numbers, they are converted to a curve or a set of curves on a graph. This conversion can easily introduce error in the computations. The error may arise from a number of factors. One such error, for example, is the inaccurate intrpretation of the computation upon interpolating the computation between the lines of a graph. This error can be caused by a variation in the paper of the graph, such as may be caused by shrinkage or expansion. It may also be caused by inaccurate printing and similar defects in the graph itself. Attempts have been made to provide for the plotting of points on graph paper from the engineering computations derived on digital equipment. One such attempt has been by photo-scanning which counts the printed lines of the coordinates of the chart in converting the computations to graph points. In this way the conversion of the information is plotted to the printed scale of the graph paper. Such a device, however, is disadvantageous because of expense and complexity. Moreover, each point is plotted by a moving mass.

It is an object of this invention to provide a device for indicating on a paper graph, computations which have been computed with digital equipment.

It is a further object of this invention to provide a device for indicating points on a paper graph by utilizing the electrical sensitivity of the graph paper.

It is still another object of this invention to provide a device for indicating computations on a paper graph as points produced by electro-sensitization of the graph paper by conductors arranged along the coordinates of the indicated computation.

A still further object of this invention is the provision of means for indicating points on electro-sensitive graph paper corresponding to digital computations which is capable of conducting electricity to a point on the paper and conducting the electricity through or across the paper at a point on the paper which will represent the computation.

It is also an object of this invention to provide a device for presenting the results from engineering computations with digital equipment in a practical form with the elimination of human error at a minimum cost and at a speed limited only by the input of the computation information.

These and other objects of this invention will become apparent upon a consideration of the following description, taken together with the accompanying drawings in which.

In general, this invention provides a device having two conductors abutting or positioned adjacent to the surface of an electro-sensitive facsimile paper. A potential is applied across the spacing between the conductors so that a path of conduction may be set up from one of the conductors to the other conductor. The electro-sensitive facsimile paper is employed as a graph paper and is positioned adjacent to or in contiguity with the conductors, so that the conduction of electricity from one of the conductors to the other will cause electricity to flow through the electro-sensitive facsimile paper at or along the path or paths of the conduction. The electro-sensitivity of the paper causes the zone of conduction to become visible on the paper.

Figure 1:
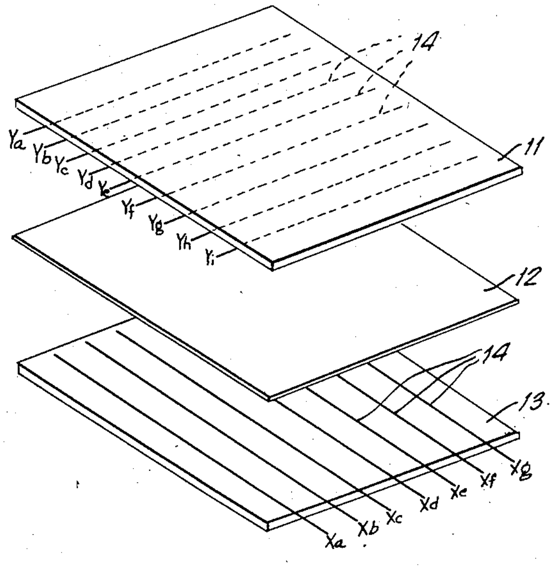
Fig. 1 is an exploded view of a simplified plotter board according to one form of this invention.

Figure 1 shows a simplified plotted board 10 made up of an ordinate plate 11, a facsimile sheet 12 and an abscissa plate 13. The ordinate plate 11 and the abscissa plate 13 both have mounted on one surface a number of metallic lines 14 extending laterally across the plate from one side to the other. The lines 14 on each of the plates 11 and 13 are spaced far enough apart to defeat any short-circuiting of current from one to the other. As shown in Fig. 1, the plotter board 10 is assembled so that the lines 14 making up the grid of the ordinate plate 11 are arranged at right angles to the lines 14 making up the grid of the abscissa plate 13. In this manner each of the lines 14 of the ordinate plate cross each of the lines 14 of the abscissa plate. In assembled position the lines 14 of the ordinate plate are in contact with the paper upper surface of the sheet 12 and the lines 14 of the abscissa plate 13 are in contact with the under surface of the sheet 12.

The lines 14 of the ordinate plate 11 are designated Y–*a*, Y–*b*, Y–*c*, Y–*d*, Y–*e*, Y–*f*, Y–*g*, Y–*h* and Y–*i*. The lines of the abscissa plate 13 are designated X–*a*, X–*b*, X–*c*, X–*d*, X–*e*, X–*f* and X–*g*. The ordinate lines and the abscissa lines cross each other. For example, the ordinate line Y–*a* crosses all of the abscissa lines X–*a* through X–*g*. At each point of crossing of these lines electricity can be conducted from one of the lines to the other. The electricity in being transmitted from one of the ordinate lines to one of the abscissa lines passes through the sheet 12 which, as mentioned above, is treated with electro-sensitive compound to react to such electrical conduction and provide a visible mark on the paper at the point of conduction. It will thus be seen that if it is desired to indicate a point on the sheet 12 having the coordinates X–*a* and Y–*a*, the point can be plotted by introducing a positive potential through the line Y–*a* and grounding the line X–*a*. All of the other wires 14 of the plotter board 10 may be disconnected either from a power source or from ground.

The conduction of electricity through Y–a to X–a and to ground will necessarily pass through the point of crossing of Y–a and X–a. At this point the electricity passing from the ordinate line to the abscissa line activates the electro-sensitive substance in the sheet and causes it to become permanently visible at the point of conduction. Similarly, if a point on the coordinates X–a and Y–b is to be indicated, the energization of the wire Y–b and the ground of the wire X–a will cause conduction through the electro-sensitive sheet 12 at the point of crossing of these two coordinates. Again, the electro-sensitive compound reacting to such a conduction causes visible marking of the sheet at this point.

Figure 2:
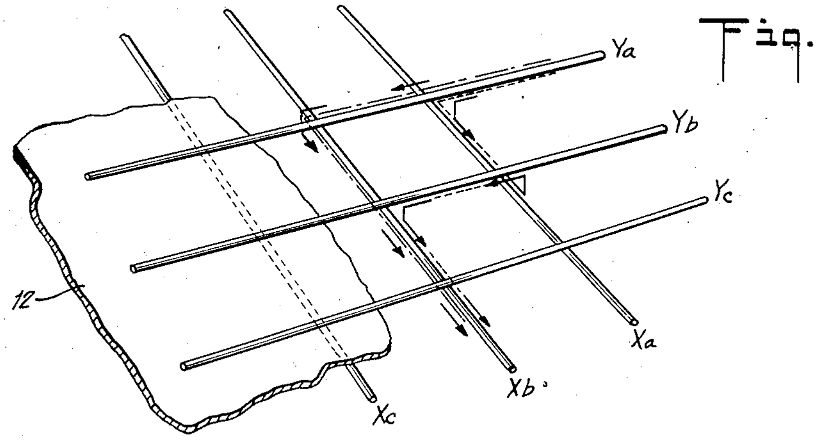
Fig. 2 is a schematic detail view of the relative positioning of the metallic conducting lines of the grids of the plotter board of Fig. 2.

Fig. 2 shows in greater detail the intersection of lines Y–a, Y–b and Y–c and X–a, X–b and X–c. The dot-dash line indicates the desired path of current through the line Y–a to the line X–b when it is desired to indicate the point having the coordinates Y–a and X–b. To avoid false current paths either being developed by the conduction of electricity through the grid lines, the abscissa lines X–a to X–g have formed thereon a rectifying surface. This rectifying surface permits the flow of electricity in one direction only between the ordinate lines Y–a through Y–i and abscissa lines X–a through X–g. The current can be carried only from the ordinate lines Y–a through Y–i to the abscissa lines X–a through X–g. The current is prevented from returning from any of the abscissa lines to the ordinate lines by the rectifying surface on the abscissa lines; thus false information from alternate paths is prevented. The rectifying surface on the abscissa lines may be a copper-oxide film on copper wires. Other rectifying surfaces on the conductors are possible as explained in greater detail below. As a result, the current can be conducted in the plotter board 10 only from the ordinate lines Y–a through Y–i to the abscissa lines X–a through X–g.

Fig. 2 shows by way of example a possible false path from Y–a to X–b as indicated by a dotted line. The dotted line path leads from line Y–a to line X–a and along line X–a to line Y–b, thence to line X–b. It will be seen that this false path results in the flow of the electricity from the abscissa grid to the ordinate grid. By inhibiting this type of current return with a one-way electrical contact between the ordinate grid and the abscissa grid, the dotted line false path is blocked. The flow of current through the coordinates X–a to X–b can pass through the sheet 12 at only one point of conduction. Thus the problem of alternate current paths is eliminated. This elimination of alternate current paths applies whenever only one coordinate conductor on each plate is gated or energized at any given instant. It will be understood that if other abscissa lines 14 are connected to ground, for example, during the conduction of current through one of the ordinate lines, that a point of conduction from one grid to the other will be indicated at each crossing of the current carrying ordinate line 14 over a grounded abscissa line 14.

Figure 3:
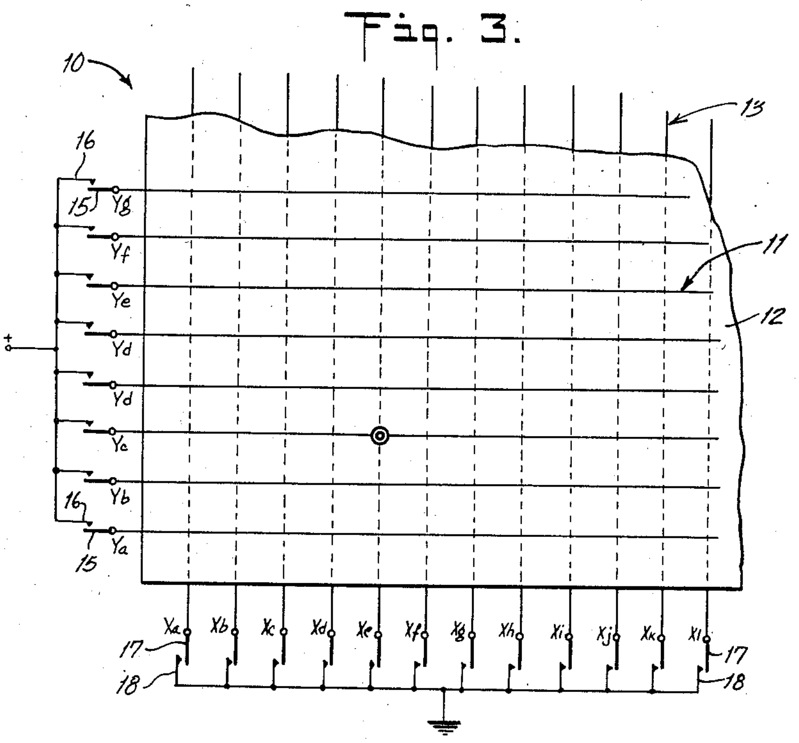
Fig. 3 is a partial view of the plotter board and the grid terminals and simplified switches of the embodiment of Fig. 1.

Fig. 3 shows a corner of the plotter board 10 with the grid terminals and switches for the coordinates attached to the coordinate lines 14 of the respective plates 11 and 13. Each of the ordinate lines Y–a to Y–i has its respective terminal 15 and its respective switch 16. Similarly, each of the abscissa lines X–a to X–i has its respective terminal 17 and its respective switch 18. Switches 16 and 18 may be operated by a tabulating and a computing machine carrying the results of the computations. A tabulating card or cards bearing a computed result may, for example, be utilized to operate the switches through suitable means for closing one switch on the ordinate axis and one switch on the abscissa axis for each point to be plotted on the plotter board 10. Thus, for example, a card carrying a computation result which has as its ordinate characteristic Y–c and as its abscissa characteristic X–e will cause the third switch from the bottom of the ordinate axis and the fifth switch from the left on the abscissa axis to close. The closing of these switches connects the Y–c ordinate to the power supply and the Y–e abscissa to ground, causing a conduction of current through Y–c to X–e and through the sheet 12 at the point when coordinates Y–c and X–e intersect, thereby making a mark on the sheet 12 at that point. The switching means are suitably connected to interlock devices which insure the return of all switches to open position before receiving the next plotting pulse. The results from a plurality of tabulating cards, in this manner, can be converted to dots on the sheet 12 by a similar closing of the ordinate switches 16 and the abscissa switches 18 to provide a graphical representation of the computation results on the cards.

Figure 4:
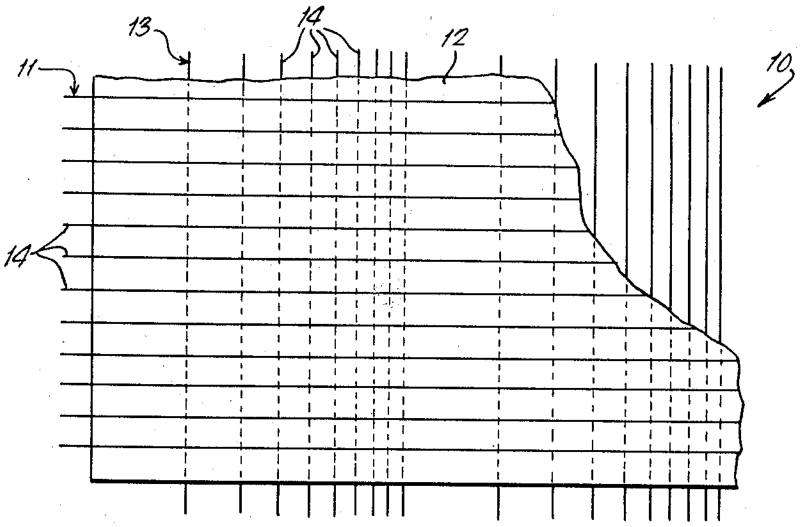
Fig. 4 is a partial view of the embodiment of Fig. 1 as a logarithmic abscissa grid plotter.

Fig. 4 illustrates the basic operation of the device of this invention. This device permits a maximum number of coordinate lines. The separation of the lines 14 on each of the plates 11 and 13 is greater than the order of the thickness of the graph paper and ranging between 25 and 50 lines per inch. The line separation, greater in spacing than the order of thickness of the graph paper, is one criterion for reducing cross-talk. Paper thicknesses range generally from .002 inch to .01 inch. The spacing of the grid for a 50 line per inch grid is 0.01 inch. The spacing may vary up to or greater than 0.05 inch. On sheets of graph paper 20 inches square, the graphical dot can be plotted to three places. Each of the lines of crossing between coordinate lines represents a potential plotted point. Thus, we see that the fineness of the plotting detail of the device of this invention is determined solely by the spacing between the lines on the ordinate and abscissa plates and that the accuracy on a sheet of 20 inches square is comparable to the plotting on equal size graph paper by manual plotting.

Figure 5:
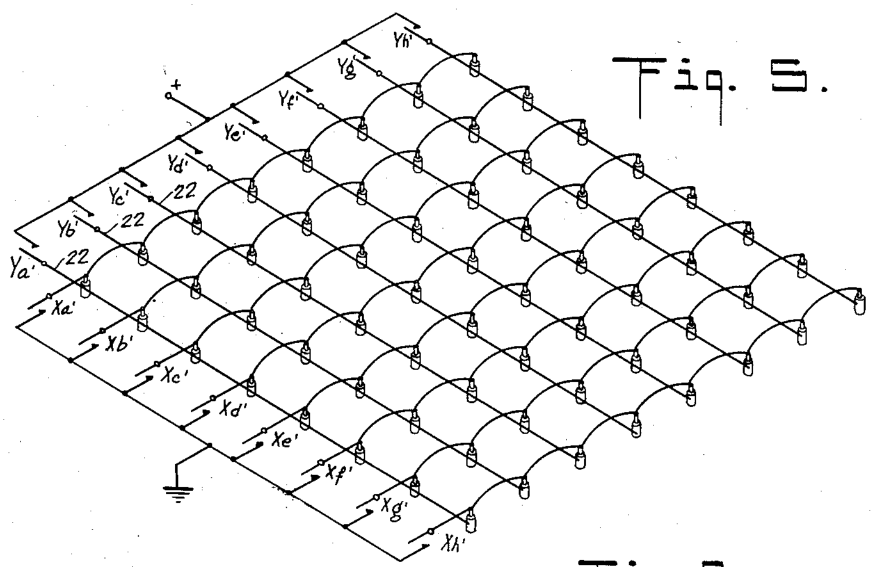
Fig. 5 is a perspective view of a schematic showing of a matrix for plotting points according to another form of this invention.

The embodiment of this invention in orthogonally placed wires on separate plates to form a plotter matrix is only one of the possible devices for providing a configuration of this invention. Another configuration for the plotter matrix is shown in Figs. 5 through 10. In this preferred embodiment of this invention, the matrix is composed of a plurality of sets of opposite potential adapted to be conductors of opposite potential positioned on the same side of the electro-sensitive paper. In Fig. 5 is shown a matrix 19 made up of a number of probes 20 arranged in a lattice along abscissa and ordinate lines. Each of the probes 20 is positioned at an intersection of an ordinate and an abscissa line. The abscissa lines are designated X–a′ through X–h′ and the ordinate lines are designated Y–a′ through Y–h′. Sixty-four probes 20 are shown in Fig. 5 and each of the abscissa and ordinate lines are attached to 8 of the probes 20. The abscissa lines may be each provided with switches 21 for connection to ground and the ordinate lines may be each provided with a switch 22 for connection to a potential source. The individual abscissa and ordinate lines may accordingly be selectively attached to ground and to a potential respectively as described above in connection with the ordinate and abscissa lines of Fig. 3.

Figure 6:
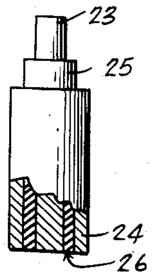
Fig. 6 is a front elevation partly in section of a plotting probe of the matrix of Fig. 5.
Figure 8:
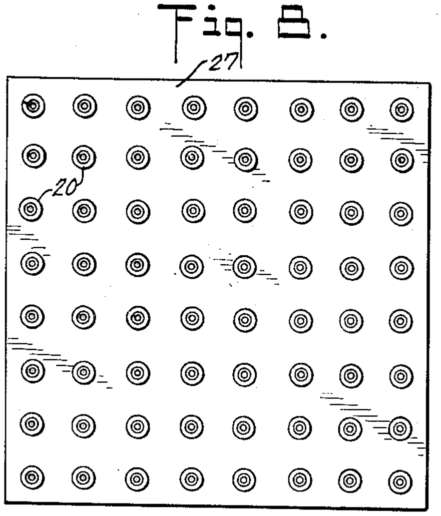
Fig. 8 is a bottom plan view of the matrix of Fig. 5 mounted in an insulator.
Figure 7:
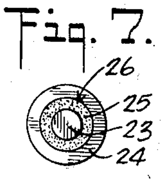
Fig. 7 is a radial bottom view of the probe of Fig. 6.
Figure 9:
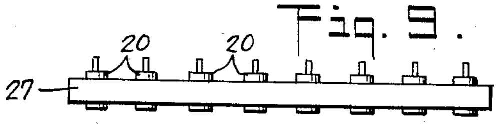
Fig. 9 is a side elevation of the matrix of Fig. 8.
Figure 10:
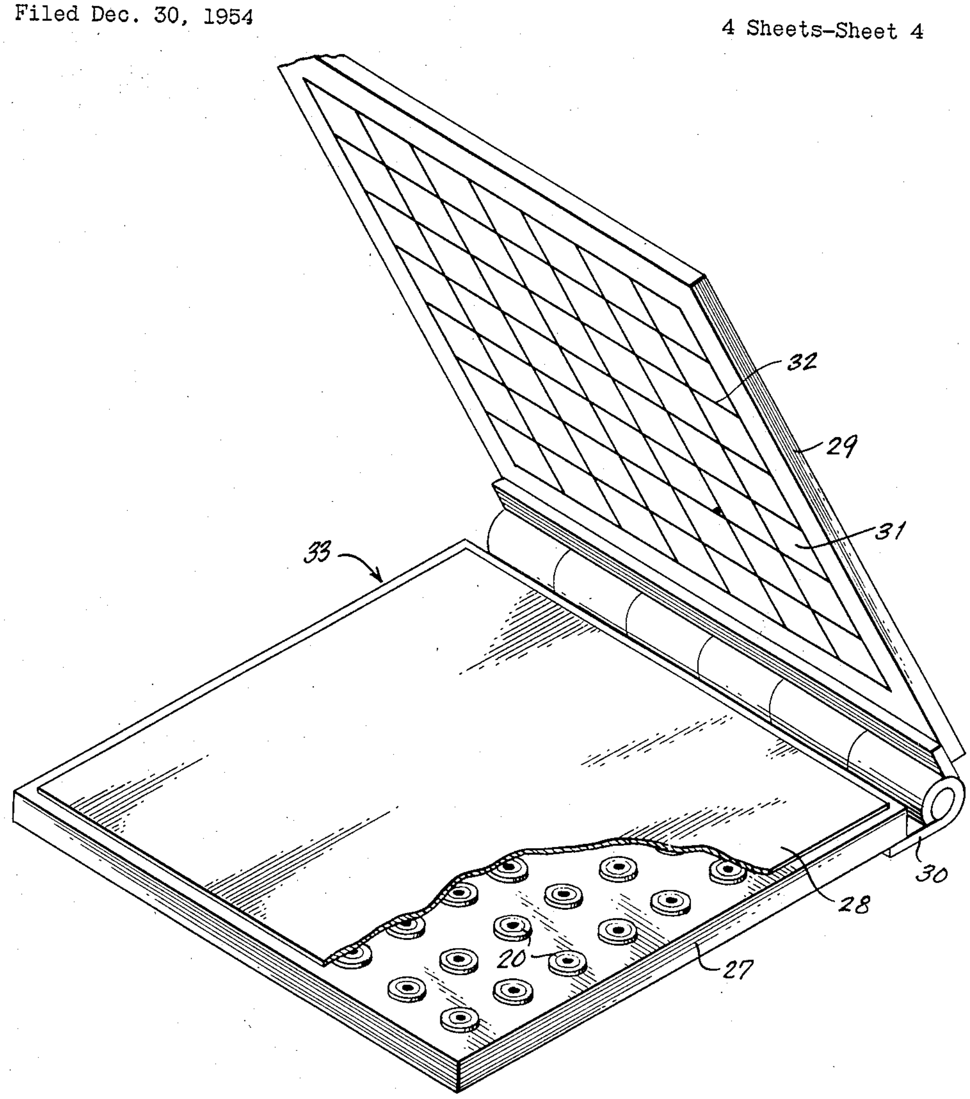
Fig. 10 is a perspective view of an assembly of a plotting matrix according to the form of Fig. 5 and a coordinate line printing plate.

Each probe 20 is made up of an inner conductor 23 as shown in Fig. 6, an outer conductor 24 and an interposed insulator 25. The inner conductor 23, the outer conductor 24 and the insulator 25 are circular in configuration and as shown in Fig. 7 are co-axial to provide a radial section in which the outer conductor 24 surrounds both the inner conductor 23 and the insulator 25 and thus contains the probe as a unit. It will be seen that if the outer conductor 24 is attached to a source of potential as indicated in Fig. 5 and the inner conductor 23 is connected to ground, there will be a tendency to cause electrical conduction across an end surface 26 of the insulator 25.

The probes 20 in this embodiment of this invention are presented to a suitable electro-sensitive graph paper as the matrix 19. Accordingly, the probes may be supported in a suitable structure, such as the frame 27, shown in Fig. 8. The frame 27 supports the various probes 20, equally spaced for positioning with relation to the electro-sensitive paper. As shown in a side elevation in Fig. 9, the probes 20 protrude from the frame 27, so that the bottom surfaces of the probes 20 will be equally spaced from the electro-sensitive paper. An application of a potential across the insulation 26 of any of the probes 20 when they are juxtaposed to or contiguous with a sheet of electro-sensitive paper may cause an electrical conduction from one conductor to the other, as indicated in the drawings from conductor 24 to conductor 23. According to this invention, this electrical conduction between the probe conductors 24 and 23 causes electrical conduction through the electro-sensitive material of the paper sheet which thereupon becomes visible at that point. Thus, as in the case of the embodiment described above, the electrical conduction at this point can be used to indicate a point on a graph. The description with relation to plotting graph points, set forth above in connection with Figs. 3 and 4, is equally applicable to the embodiment shown in Figs. 5 through 10.

In the operation of the devices of this invention, the signal to the matrix originates at some device for reading the computation results on the means which stores the results, such as a tabulating card. The reading mechanism is controlled by suitable timing mechanism and suitable interlock mechanism to space the release of information from the card to the matrix. It is a feature of this invention that this spacing of the feeding of the information from the card reader can be as rapid as the feeding of the carded information into the card reader. The computaton results are divided into ordinate and abscissa information, which information is relayed through ordinate and abscissa counter-stages respectively to the ordinate and abscissa switches. The current from the power supply carries the information from the ordinate switches through the plotter to the abscissa switches and through the closed abscissa switches to the ground. The release of the current to ground through the abscissa switch may operate the interlock which may simultaneously reset the ordinate and abscissa counters opening their respective switches and sets up the card reader for the next card. The cycle is then repeated.

While this description has referred to an input of information taken from computation results as present on cards, it will be understood that the information input could be presented on tape with a resultant actuation of the ordinate and abscissa switches and marking on the electro-sensitive plotting sheet.

The electro-sensitive paper which may be employed in this invention has a wide range in conductivity characteristics. Various papers have various transverse or across-the-paper-surface-conductivity. Some types of rag papers which have been soaked in electro-chemical solution have low transverse resistance. Several commercial papers, which are electrically sensitive, may be employed. For example, Teledeltos and Alfax electro-sensitive papers have been found to be useable in devices constructed according to this invention. Also, a 2% solution of potassium iodide, applied on ordinary paper stock, has been found to produce an acceptable electro-sensitive sheet useable in this invention. With proper apparatus, a phenophthalein solution may be applied to paper to form an acceptable sheet. The various papers will present variable results with the various appparatus of this invention. It is necessary, therefore, to select a paper which will not allow spurious cross-talk or false points between conductors when employing this invention.

The preferred embodiment of Figs. 5 through 10 may be operated with electro-sensitive paper having a lower transverse resistance than the embodiment of Figs. 1 through 3. In the co-axial conductors 23 and 24 of the probes 20 of the preferred embodiment, the conductor 24 completely surrounds the inner conductor 23 with the result that the cross-talk or false conduction points are greatly reduced, if not completely eliminated. This allows the points of conduction to be placed much closer together than in other embodiments of the invention, such as in Figs. 1 through 3. One result of the closer spacing of points is the possibility of plotting a greater number of points per inch for a paper having a given transverse electrical resistance.

This invention has been described as applied to converting information to a Cartesian chart. It will be understood that it is within the scope of this invention to replace the Cartesian graph of the ordinate and abscissa plates 11 and 13 with a logarithmic grid in the abscissa grid particularly. With a logarithmic spacing, an abscissa grid can be made up on a semilog basis using the same type of counters and switching as that of the Cartesian spaced abscissa grid. This, of course, assumes that the input of the plotter board in the device when so modified would be properly coded. The device of this invention can also be applied to a polar grid.

Another modification of this invention is to impregnate the graph paper with a light-sensitive dye and provide a light-sensitive source beneath the plotting board. In this way, one of the grids can be printed on the graph paper in a distinguishable color and in contrast with the plotted point, and thus produce the coordinate lines on the graph paper. Another means for applying the coordinate lines to the graph paper in a manner to avoid errors from paper shrinkage is shown in the data plotter 33 of Fig. 10. The matrix 19 of the preferred embodiment mounted in the frame 27 is shown with the conducting surfaces facing upward and overlaid by a sheet of photo-sensitive paper 28. The frame 27 has associated with it a lid 29 which is hinged on the frame 27 by a hinge 30.

The lid 29 contains a printing plate 31. The printing plate contains conducting coordinate lines 32 which are formed in the plate 31 by any suitable means such as off-setting, etching or engraving. The coordinate lines 32 are suitably connected to a source of potential by means not shown. Coordinate lines may be printed on the electro-sensitive sheet 28 by placing the plate adjacent to or in contiguity with the sheet 28 and applying a potential to cause conduction along the lines 32 with consequent and characteristic graph lines being formed on the sheet 28. As shown in the data plotter 33 of Fig. 10, the plotting matrix in the frame 27 and the printing plate 31 can thus be accurately aligned immediately before or immediately after the plotting of the computed points by the matrix 19 according to the manner of operation described above. In this way the problem of paper shrinkage or stretch is eliminated.

This invention is applicable in many variations as indicated by the above embodiments. Various modifications in the components may be employed while still obtaining the desired effect and novel result of this invention. For example, the conductors 23 and 24 of the preferred embodiment and wires 14 of the embodiment of Figs. 1 through 4 may be composed of copper. However, aluminum and silver have been found to be acceptable. Any good electrical conductor which does not react with the electro-sensitive solution of the graph paper may be employed as a conductor. Accordingly, iron or steel are inapplicable in embodiments which employ such electro-sensitive solutions as potassium iodide. Further, the rectifying surface in the orthogonal wire matrix may be a copper oxide surface and also other coatings of such substances as selenium, germanium and silicon will provide the necessary rectifying action.

In the operation of the device of this invention, it has been found that certain electrically sensitive papers have surfaces which require a minimum level of voltage for printing. Below this minimum level of voltage no printing occurs. As an adaptation of this invention, it has been found possible to employ this minimum level of printing voltage to reduce and eliminate the printing of false points. Some of the solutions used to sensitize the electro-sensitive paper have been found to have a minimum level of printing voltage which is half of a normal printing voltage. With the device of the preferred embodiment, it is possible to maintain, at a standard voltage between the conductors 23 and 24 of each of the individual probes 20, a voltage which is not greater than this minimum level printing voltage. Thus, between any two conductors that are not engaged in printing operation, there will be less than the minimum level of voltage for printing and no false indications are possible. The printing in such a case will be achieved by applying the normal printing potential across the conductors of the probe at the point where the printing is desired.

The device of the preferred embodiment permits close spacing of plotting points with a minimum of cross-talk or false points. The gradient printing provided by the above mentioned minimum level of printing voltage possible with certain electro-sensitive papers is one of the factors in eliminating of spurious response. Another factor has been pointed out above comprising the manner in which the outer conductor 24 surrounds the indicating unit in the form of the probe 20. A matrix embodying this form of the invention has been found to operate with a spacing between the probes of one-tenth of an inch, so that a plotting of 10 points to an inch is possible. The co-axial electrodes have a further advantage in producing a neat circular dot rather than a mark of indefinite shape.

Thus, this device fulfills the requirements of a data plotter, eliminating errors due to paper shrinkage and graph line inaccuracies while being limited in its operation only by the rate of input of the computation result information. The device of this invention is also advantageous in that its consists of components which are readily available. Further, the device of this invention utilizes no moving parts in the plotting portion which not only reduces the complexity of its structure, but also contributes to the high plotting speed which is necessary to accommodate the rate of information input from the result carrying means. As indicated above, by means of various electrical sensitive and light-sensitive dyes, distinguishable information can be presented on a single sheet of graph paper.

Further, when dealing with a graph having Cartesian coordinates, the four quadrants can be presented by a single machine without a change in switching circuits. The axis can be translated to any portion of the graph by pre-addition of constants N and M to the X and Y values on the abscissa and ordinate lines, respectively. Thus the four quadrants of a Cartesian chart can be printed on the same sheet of paper by the same apparatus. It is also possible, without any wiring changes, to print the four quadrants on four separate sheets of paper. This may be accomplished by adding suitable constituents to the independent and computed variables.

It will be understood that the above description is for the purpose of illustration and the various modifications of the described structure may be made without departing from the spirit of this invention. Consequently, it is intended that this invention be limited only by the scope of the following claims.

What is claimed is:

1. In a graph plotting device a combination of an electro-sensitive graph paper sheet, a matrix of marking units on one side of said sheet in close proximity to said sheet, a first conductor in each of said units, a second conductor in each of said units positioned within said first conductor, an insulator separating said conductors, a first set of conducting lines each connecting a group of said first conductors and a second set of conducting lines each connecting a group of said second conductors, said first and second sets of conducting lines being positioned with relation to each other to form said matrix of marking units in a lattice geometry, potential producing means attached to each of said first conducting lines for individually applying a voltage to one and only one line of said first set of conducting lines and means attached to each of said second conducting lines for individually receiving said voltage through one line and only one line from said second set of conducting lines in a single time interval.

2. In a graph plotting device, as claimed in claim 1, an electro-sensitive paper sheet having surface resistance providing a minimum voltage for transverse conduction across the sheet surface and potential producing means for applying a voltage across the first and second conductors of each marking unit in excess of the minimum voltage of conduction transversely of the surface of said sheet.

3. In a device for plotting graphs of electro-sensitive graph paper having a surface requiring a minimum transverse surface conducting voltage, a plurality of marking units, each of said marking units containing a first conductor, a second conductor positioned within said first conductor and an insulator separating said first and second conductors, said marking units being arranged in a matrix on a lattice geometry making up the intersecting coordinates of a graph, a plurality of first conducting lines connecting separate groups of said first conductors along one coordinate in said matrix, a plurality of second conducting lines connecting separate groups of said second conductors along the intersecting coordinate of said martix, individual means connected to each of said conducting lines for connecting said lines to a potential source and individual means connected to each of said second conducting lines for connecting said lines to ground, said individual means being individually operable to provide a potential at said first and second conductors in excess of said minimum voltage.

4. A device for plotting along coordinates on a sheet of electro-sensitive graph paper including a plurality of marking units each including a pair of concentric conductors, and an insulator separating said conductors, said units being arranged in a matrix on a lattice geometry to form intersecting coordinates of a graph, a plurality of first conducting lines connecting separate groups of said first conductors along one coordinate in said matrix, a plurality of second conducting lines connecting separate groups of said second conductors along the intersecting coordinate of said matrix, and means attached to said first and second conducting lines for selectively passing electric current through one of said first conducting lines and one of said second conducting lines simultaneously to provide an electric potential at the marking unit common to said conducting lines.

References Cited in the file of this patent

UNITED STATES PATENTS 2,610,102 Gitzendanner et al. ______ Sept. 9, 1952

FOREIGN PATENTS 241,766 Switzerland ____________ Aug. 16, 1946

UNITED STATES PATENT OFFICE

CERTIFICATE OF CORRECTION

ıtent No. 2,869,965 January 20, 1959

Dennis D. Willard

It is hereby certified that error appears in the printed specification f the above numbered patent requiring correction and that the said Letters ıtent should read as corrected below.

Column 4, lines 41 and 42, strike out "opposite potential adapted to be ›nductors of opposite potential" and insert instead -- conductors of opposite ›tential adapted to be --.

Signed and sealed this 26th day of May 1959.

;EAL)
:test:

ıRL H. AXLINE
.testing Officer

ROBERT C. WATSON
Commissioner of Patents